United States Patent [19]
Parker et al.

[11] Patent Number: 5,179,524
[45] Date of Patent: Jan. 12, 1993

[54] FAN-POWERED MIXING BOX ASSEMBLY

[75] Inventors: Jeffrey L. Parker; Edward Parker, both of Jacksonville, Fla.

[73] Assignee: Carrier Corporation, Syracuse, N.Y.

[21] Appl. No.: 520,121

[22] Filed: May 7, 1990

Related U.S. Application Data

[63] Continuation of Ser. No. 176,461, Apr. 1, 1988, abandoned.

[51] Int. Cl.⁵ .................. G06F 15/20; F24F 13/04
[52] U.S. Cl. .................... 364/505; 165/22; 236/1 B; 236/49.4; 364/145
[58] Field of Search ............ 98/1, 1.5; 165/2, 22, 165/28, 48.1, 50, 59; 236/49 D, 1 B, 49.4; 364/143, 144, 145, 557, 505

[56] References Cited

U.S. PATENT DOCUMENTS

| | | | |
|---|---|---|---|
| 3,933,197 | 1/1976 | Zimmer et al. | 165/2 |
| 4,013,118 | 3/1977 | Zimmer et al. | 165/22 |
| 4,071,745 | 1/1978 | Hall | 165/22 X |
| 4,200,910 | 4/1980 | Hall | 364/145 |
| 4,205,381 | 5/1980 | Games et al. | 364/505 |
| 4,267,967 | 5/1981 | Beck et al. | 236/49 D X |
| 4,352,453 | 10/1982 | McNabney | 236/49.4 X |
| 4,406,397 | 9/1983 | Kamata et al. | 236/49 D X |
| 4,811,897 | 3/1989 | Kobayashi et al. | 165/22 X |
| 4,817,863 | 4/1989 | Bragg et al. | 236/49.4 |
| 4,829,447 | 5/1989 | Parker et al. | 165/22 X |
| 4,843,084 | 6/1989 | Parker et al. | 165/22 X |
| 4,931,948 | 6/1990 | Parker et al. | 364/505 |
| 5,076,346 | 12/1991 | Otsuka | 236/1 B X |

*Primary Examiner*—Kevin J. Teska
*Assistant Examiner*—Edward R. Cosimano
*Attorney, Agent, or Firm*—Arthur G. Yeager

[57] ABSTRACT

A fan-powered mixing box assembly through which conditioned air is supplied to a plurality of zones is controlled by a programmable fan-box monitor. The assembly comprises a mixing box, a multi-speed fan and a heating element having several stages. The monitor receives data from and transmits data to a plurality of programmable zone thermostats each of which controls a zone via a duct damper through which air enters the zone. The monitor receives data from duct temperature and duct air pressure sensors for use in controlling the fan and heating element. Also, the monitor is responsive to signals representative of the real time for operating the assembly in setback modes when the various zones are not occupied. The monitor modulates a master damper for control of supply air.

47 Claims, 11 Drawing Sheets

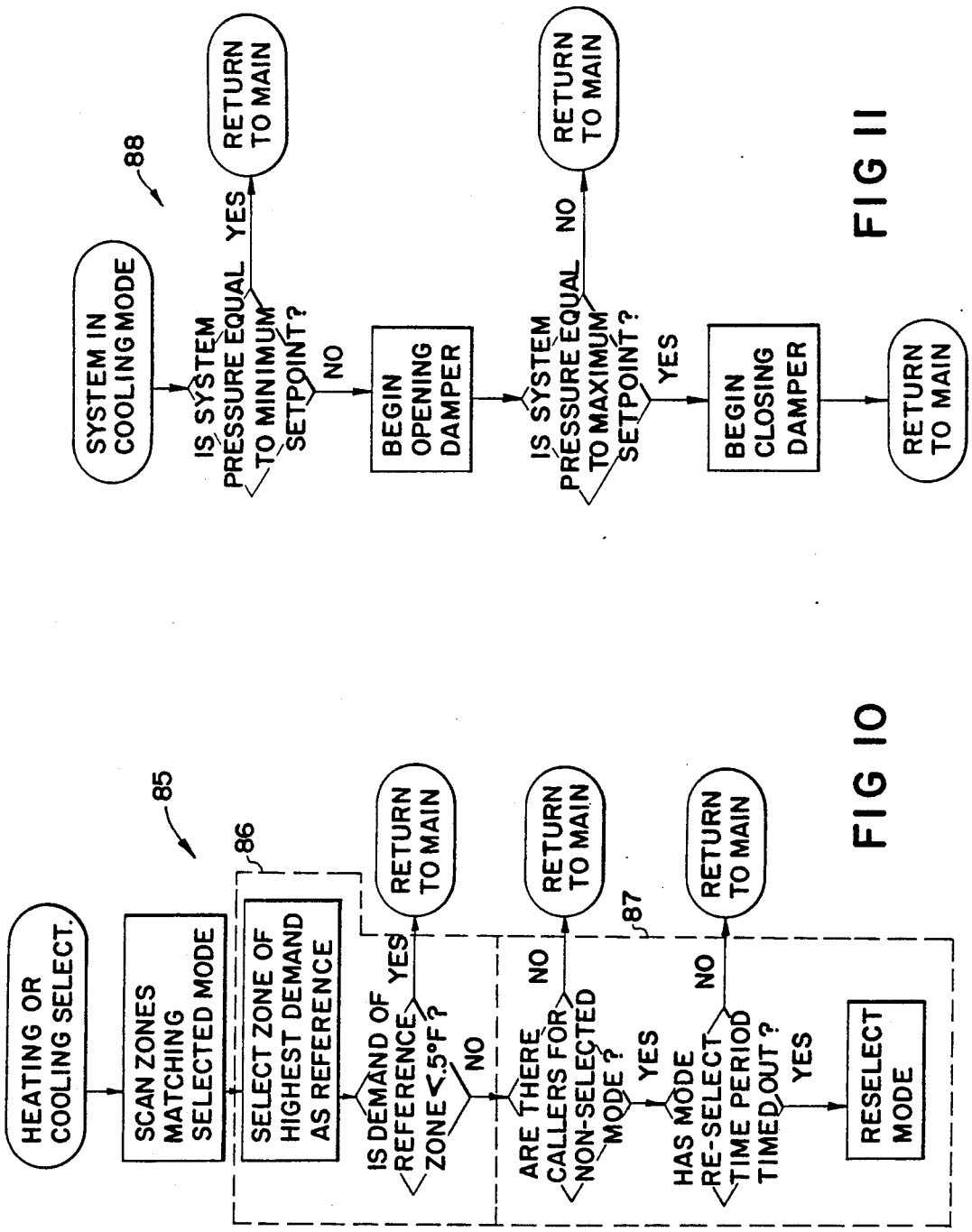

FAN-POWERED MIXING BOX ASSEMBLY

This is a continuation of copending application Ser. No. 07/176,461 filed on Apr. 1, 1988 now abandoned.

RELATED U.S. APPLICATIONS

The following copending applications are to be considered herein:

Thermostat, Ser. No. 013868, filed Feb. 12, 1987; now U.S. Pat. No. 4,884,214 issued Nov. 28, 1989;

Thermostat Control System, Ser. No. 013869, filed Feb. 12, 1987; now U.S. Pat. No. 4,843,084 issued Jun. 27, 1989;

Method and System For Controlling A Single Zone HVAC Supplying Multiple Zones, Ser. No. 013870, filed Feb. 12, 1987; now U.S. Pat. No. 4,931,948 issued Jun. 5, 1990;

Bypass Controller and Bypass System, Ser. No. 064540, filed Jun. 22, 1987; now U.S. Pat. No. 4,829,447 issued May 9, 1989.

BACKGROUND OF THE INVENTION

1. Field of the Invention

The present invention relates to apparatus and methods for use with heating, ventilation, and air conditioning (HVAC) units and particularly to the use of fan-powered mixing box assemblies (also called power induction units (PIU) in variable air volume (VAV) and variable volume/variable temperature (VVT) systems.

2. Prior Art

The present invention relates to fan-powered mixing box assemblies and microcomputer controls used therewith.

In many large buildings, the economics of using several heating, ventilation and air conditioning (HVAC) units becomes impractical and large single HVAC units are used. In the usual VAV system application, a single large HVAC unit supplies conditioned air to the various zones via zone dampers, such zone dampers controlling air flow only. As various zone dampers modulate closed because the zone demands have been met, as established by a local thermostat, the air flow through the remaining dampers will increase. Methods of accommodating the additional and often excessive air flow that can result consist generally of air control systems such as discharge dampers and variable speed fans. Air flow sensors and air pressure sensors can be utilized in conjunction with the local thermostat controlling the zone damper. This capability allows the air flow to a given zone to be controlled independently of system pressure variations. The use of fan-powered mixing box assemblies in a VAV system may provide a fan-powered source of heat in addition to the HVAC supplying heated air to the zone via its zone damper. This type of design also can be used in the perimeter areas of a large building that might require heat on cold days independently of or in addition to that supplied by the operation of the central HVAC unit providing conditioned air to other parts of the building.

The use of an air flow sensor allows for control of a damper to limit the maximum air flow to a conditioned space independently of system pressure variations which may exist in large duct systems. In smaller systems, where pressure variations in the system are small, fan control can be used.

While the use of fan-powered mixing box assemblies combine the flexibility of decentralized heating with the benefits of VAV cooling systems, conventional systems have several disadvantages. First, because each fan-powered mixing box requires electric power for both the fan and heater, the large number of electrical connections can be expensive and difficult to install and maintain. Second, the high cost of using many smaller mixing box assemblies often requires the use of fewer, larger units serving larger zones resulting in a system with poor characteristics regarding the heating and cooling demands. Finally, the distributive nature of the system requires access to tenant areas in multiple occupancy buildings which is intrusive and can require extensive scheduling problems.

In the present invention, each of several large fan-powered mixing box assemblies can be treated as though it were a separate HVAC unit operated by a microcomputer controlled monitor with zone dampers controlled via VVT monitor-stats as described in the related U.S. applications identified above. None of the prior art fan-powered mixing box systems provide the ease of operation and maintenance and the degree of zone control as the fan-powered VVT system in accord with the present invention.

SUMMARY OF THE INVENTION

The present invention includes a fan-powered mixing box assembly having a damper and multiple heating elements and a microcomputer-controlled fan-box monitor for operating the mixing box as though it were a single HVAC unit employed in a variable air volume (VAV) or variable volume/variable temperature (VVT) system. The fan-box monitor includes software to operate the mixing box to supply conditioned air to each of a plurality of zones in the particular system via the main damper associated with the mixing box and zone dampers each of which is controlled by a zone thermostat or similar electronic controls.

The fan-box monitor receives information from the zone thermostats regarding the condition of air in each zone and, in accord with its own software, will operate the mixing box fan and the associated heating elements and damper (and supplemental heating sources, if provided). The fan-box monitor is programmable, in large part, by the user and includes a real time clock for time-basing all the functions.

In accordance with the present invention, the system employs a heating, ventilating and air conditioning (HVAC) unit for controlling the condition of air in each of a plurality of zones supplied with conditioned air via a main duct when using a fan-powered mixing box assembly in the main duct and including a fan and at least one heating element for heating air supplied to the main duct to supply conditioned air to each zone via a master damper means controlling air flow in the main duct. A zone damper means in a zone duct controls the flow of air and communicates between the main duct and each zone. A programmable fan-box monitor means controls the fan-powered mixing box assembly and the programmable fan-box monitor means receives information from a controller means located in each zone interfaced with and controlling respective zone damper means in the respective zone duct, and means for determining the condition of the air in each zone and supplying such information to the fan-box monitor means. The fan-box monitor means operates the fan-powered mixing box assembly in accordance with its programming, the condition of air in each zone, and in accordance with the information received from each controller means to control the fan-powered mixing box in the heating or cooling mode. The controller means includes a zone thermostat, and the means for determining the condition of air in each zone includes a first sensor for determining the temperature of the air in its respective zone, with the first sensor providing electrical signals to the thermostat indicative of the temperature of the air in the zone. The zone thermostat also includes means for establishing the desired temperature in its zone.

Basically, the method according to the invention controls the operation of a plurality of zone duct damper means located in respective zone ducts and a fan-powered mixing box assembly controlled by a means supplying heated or cooled conditioned air into a main duct having air flow control means in the main duct which communicates with zone ducts associated with respective zones and comprises: (A) determining the demand for heating or cooling in all zones and the heating or cooling mode for the fan-powered mixing box; (B) controlling the fan-powered mixing box in the heating or cooling mode selected; (C) operating zone duct dampers to close all not desiring conditioned air from the fan-powered mixing box in the mode selected and to open all desiring conditioned air in the mode selected; and (D) operating the air flow control means and the fan-powered mixing box to control air supplied to the zones until all zones demanding the selected mode have been substantially satisfied. The method further comprises (E) determining the zone which has the greatest demand after step (A); and (F) operating the air flow control means and the fan-powered mixing box to control air supplied to the zones until the reference zone has been substantially satisfied. Also, the method may include (G) measuring the temperature trend in the reference zone when the fan-powered mixing box is in the heating mode; and (H) operating the fan-powered mixing box to supply heating to the reference zone in response to the temperature trend.

In accord with the various aspects of the invention, the fan-box monitor supplies heated or cooled air to the associated zones after the system demand is determined by information received from each zone in the system by the fan-box monitor. Demand from each zone in the system is continuously monitored by the fan-box monitor for the purpose of augmenting the heat supplied or switching the system to another mode. The fan-box monitor also includes both inside and outside air temperature sensors for controlling the operation of the system in response to environmental conditions. In addition, the temperature trend is monitored in a selected reference zone for purposes of determining whether the heating elements or fan mode needs to be changed. The fan-box monitor accomplishes the task of controlling system mode and air pressure in response to computer programs contained in the memory of the monitor.

In summary, a fan-box monitor includes embedded programming for the control of the fan-powered mixing box in response to inputs to the monitor from associated instrumentation such as temperature sensors and zone thermostats. The mixing box is operated in accordance with preprogrammed instructions and setpoints some of which have been entered by the operator and some of which are installed by the manufacturer. This latter group of programs includes the communications capability by which the fan-box monitor scans and receives information from the various devices in the electronic network. Much of the programming involves entering operator-selected values into the fan-box monitor memory from which they are accessed by the microcomputer in the fan-box monitor.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 10 is a simplified flow chart of temperature regulation and mode reselection program;

FIG. 11 is a simplified flow chart of the program for pressure control in the cooling mode;

DETAILED DESCRIPTION OF THE PREFERRED EMBODIMENT OF THE INVENTION

Figure 1:
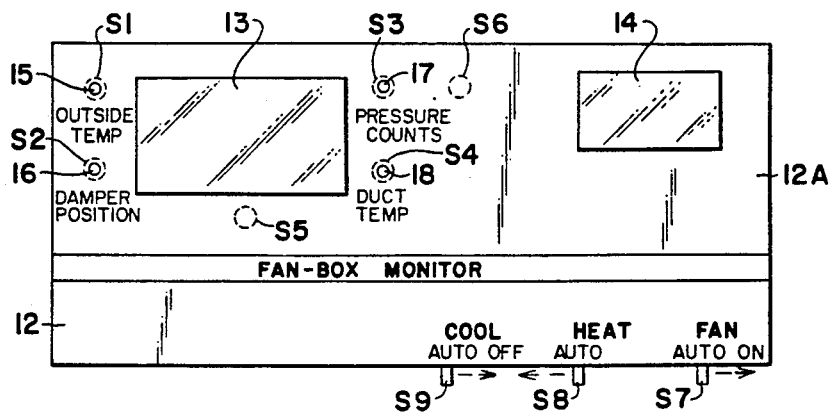
FIG. 1 is a front elevational view of the fan-box monitor used in the present invention.
Figure 2:
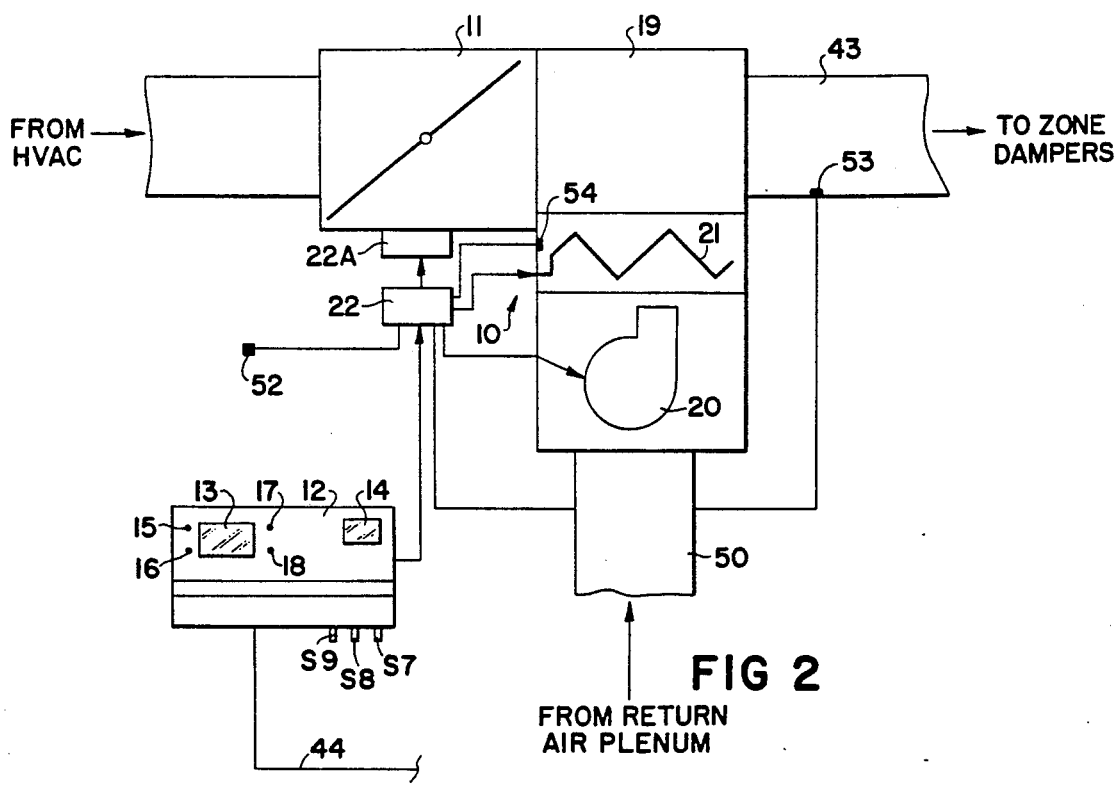
FIG. 2 is a pictorial diagram of the fan-powered mixing box assembly used in accord with the present invention and illustrating its physical placement communicating with a duct system.

Referring now to the drawings, the fan-powered mixing box assembly in accord with the present invention is depicted by the numeral 10 in FIG. 2 illustrating its relative placement in a duct wherein air flow is controlled by a damper 11. The electronic controls for the damper 11 and mixing box 19 are comprised of a microcomputer-controlled fan-box monitor 12. The fan-box monitor 12 shown in FIG. 1, has a removable front cover 12a, a liquid crystal display 13, a real time clock 14 and four resilient portions 15-18 for operating switches S1-S4 respectively which are located below the cover 12a. The electronic circuitry in the fan-box monitor 12 is substantially identical in all respects to the electronic circuitry employed in the monitor thermostats disclosed in our first three copending applications identified above. The fan-box monitor 12 employs a conventional microcomputer with internal memory supplemented by programmable logic consisting of an electronically erasable Prom (EEPROM) and a ROM which contains instruction codes and fixed data. S7, S8, and S9, each of which are standard 2-position switches, enable their functions as indicated.

Air flow through the main or master damper 11 is mixed in box 19 with air supplied by fan 20 through heating element 21. As a matter of electrical design, the control signals from fan-box monitor 12 are wired to damper control board 22 from which relay control signals are derived for operation of the damper motor 22a, the fan 20, and the heating element 21. The damper control board 22 that is used in the present invention is preferably identical to that used with the monitor thermostats in the "thermostat control system" and VVT system applications referenced above.

Figure 3:
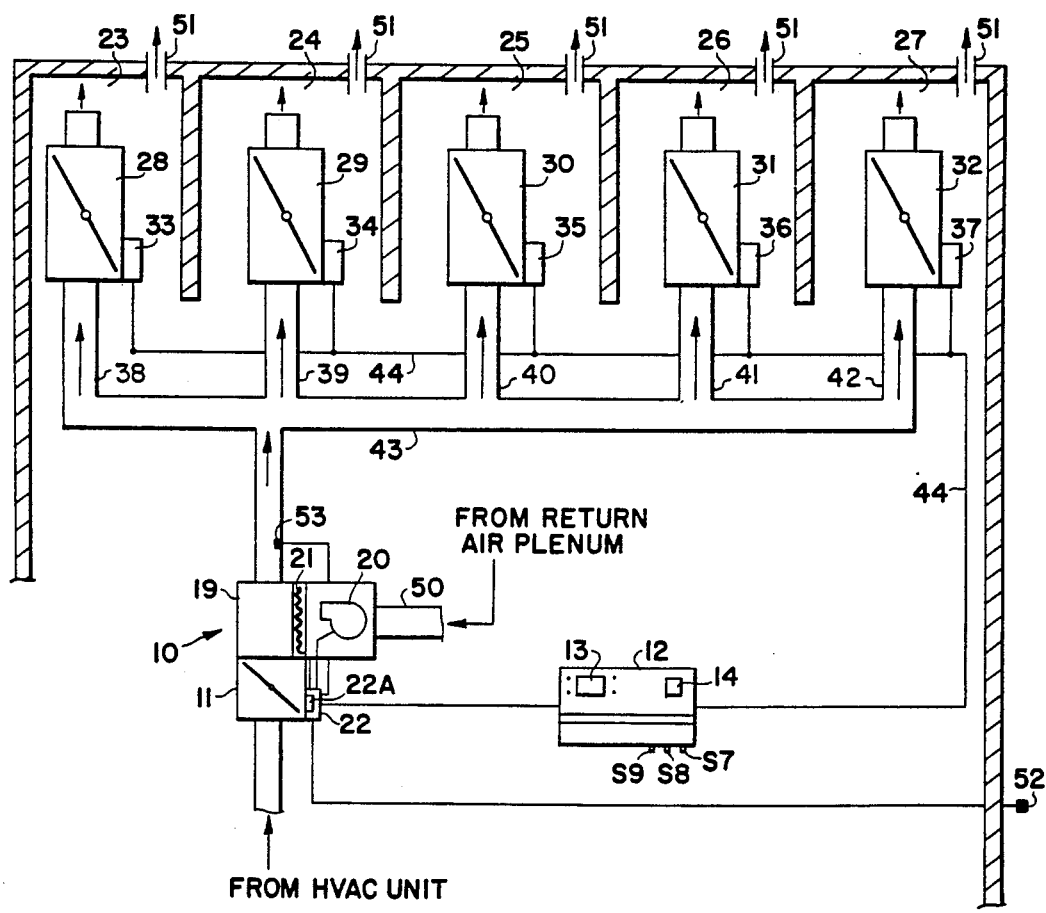
FIG. 3 is a pictorial diagram of the fan-powered mixing box assembly and its electronic monitor as used in a system serving five zones.

Referring now to FIG. 3, an overview of the fan-powered mixing box assembly 10 as used in a system of five zones will be of assistance in understanding the details hereinafter set forth. Zones 23, 24, 25, 26 and 27 are supplied air which is regulated by dampers 28, 29, 30, 31 and 32 and thermostats 33, 34, 35, 36 and 37 via ducts 38, 39, 40, 41 and 42 respectively. Each of the thermostats 33–37 is preferably identical to the slave thermostats described in the copending application "Thermostat" referenced above. Depending upon the system design, however, one thermostat may be a monitor-stat that controls the system HVAC unit. A trunk duct 43 is supplied air from the HVAC unit via damper 11. Air from the return air plenum located in the ceiling of the building is supplied to return duct 50 which is also in communication via the plenum with zone return ducts 51. As illustrated in FIG. 3 the fan-box monitor 12 is in electronic communication with all thermostats 33-37 via bus 44. The monitor 12 controls damper 11, the activation of fan 20 and heater 21 depending upon the demand for cooling and heating in the zones 23–27. The fan-powered mixing box assembly 10 is in essence designed to be an auxiliary HVAC unit so far as the programs and logic of the system design is concerned. A description of programming and operation of the fan-box monitor 12 will illustrate the unique features of the invention.

Figure 4:
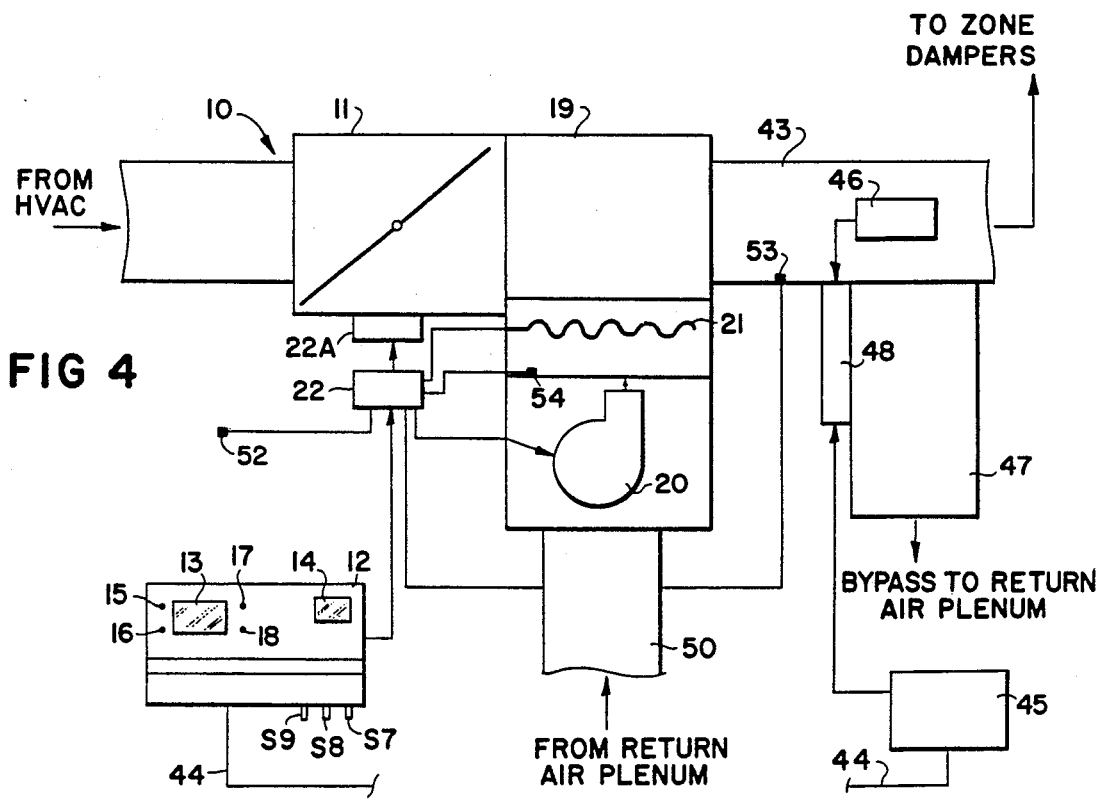
FIG. 4 is a pictorial diagram of the fan-powered mixing box assembly in accord with the present invention used with an optional bypass controller.

As illustrated in FIG. 4 of the application "Thermostat Control System", Ser. No. 013869, filed Feb. 12, 1987, now U.S. Pat. No. 4,843,084, issued Jun. 27, 1989, switches S1–S4; S5, and S6 are used to provide digital input signals to the electronic controls of the thermostat described therein. In the fan-box monitor 12, switch S1 is located beneath resilient portion 15 ("Outside Temperature"); switch S2 is located beneath resilient portion 16 ("Damper Position"); switch S3 is located beneath resilient portion 17 ("Pressure Counts"); and S4 is located beneath resilient portion 18 ("Duct Temp."). Switches S1–S4 provide input signals to general purpose interface circuit U4 which is electrically interfaced to microprocessor U1. S5 a rotary BCD switch, supplies data to U4 and S6 supplies as input signal to U1. S5 and program switch S6 are accessible only by removing cover 12a. During programming of the fan-box monitor 12 cover 12a is removed and switches S1-S6 are operated directly by the installer, during normal operation of the fan-box monitor 12 switches S1–S4 are operated by depressing a resilient portion 15–18 respectively to display the associated data on display 13.

Figure 7:
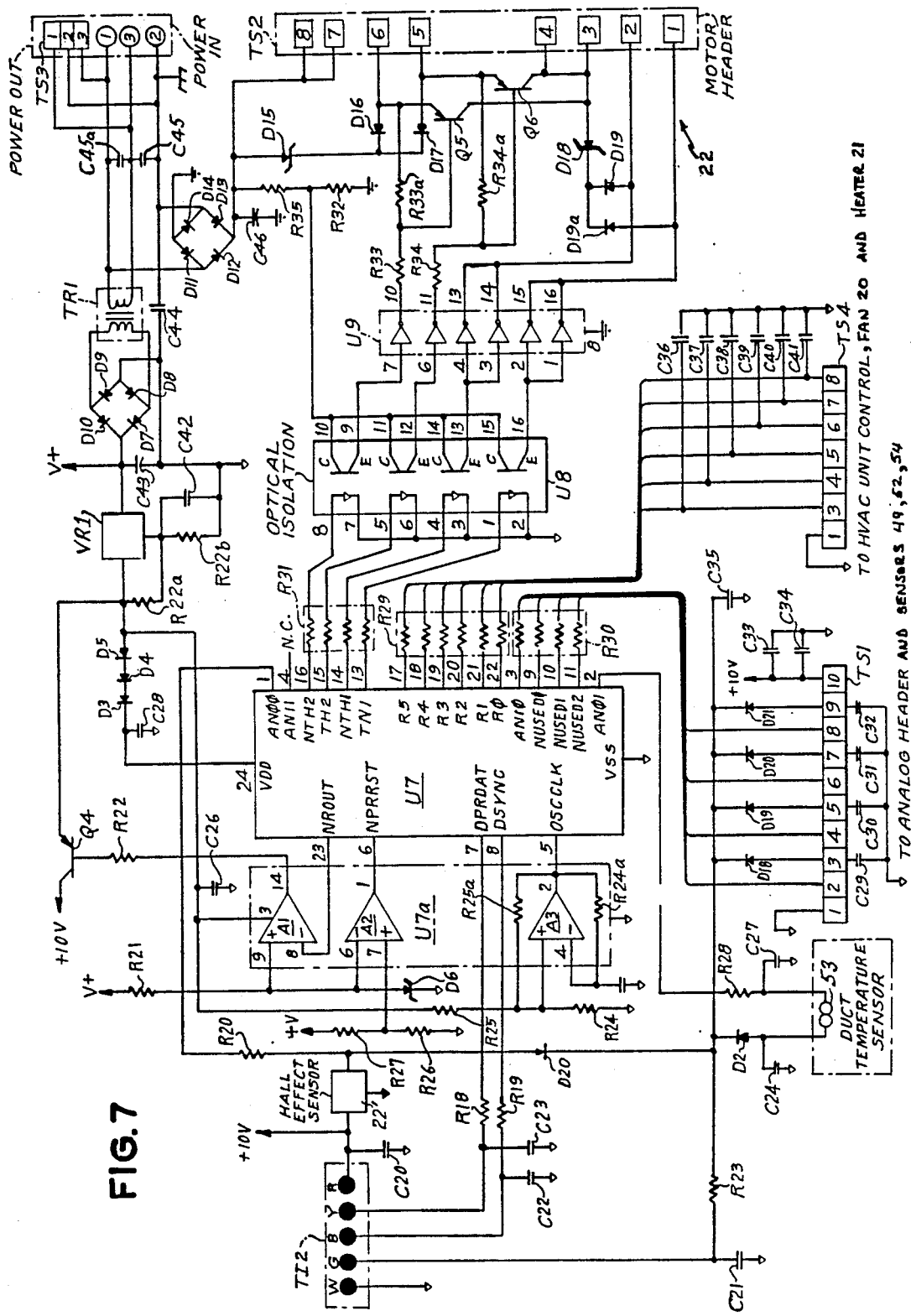
FIG. 7 is an electrical schematic of the damper board used in the invention.

Damper board 22 is illustrated in FIG. 7 of the "Thermostat Control System" reference above. Fan 20 and heating element 21 are controlled via U7 which supplies output signals to TS4 (identified on FIG. 7 as "To HVAC Unit Control"). Analog sensors such as outside air temperature sensor 52 and air pressure sensor 49 are enabled by U7 via TS1. Controls for duct temperature sensor 53 and motor 22a are the same as that described in the "Thermostat Control System" application.

PROGRAMMING THE MONITOR CONFIGURATION DISPLAY

Switches S1–S4, 16-position rotary BCD switch S5 and display 13 are used for the general programming of the functions of the monitor 12. The display 13 is a conventional LCD display and is divided into four sections for purposes of describing the programming of the monitor 12.

1. Configuration Display #1

In Configuration Display #1, a 2-digit number is displayed in the upper left-hand portion of the display 13. S1 (raise) and S2 (lower) are used to adjust the displayed 0 number to the desired value. A 2-digit number is also displayed in the lower right-hand portion of the display 13 and this value is established by S3 (raise) and S4 (lower).

2. Configuration Display #2

In "Config. #2", one number is displayed on the display 13. The number may contain from 2 to 4 digits with the most significant digits in the upper left-hand corner. Switches S1 and S2 are used to raise or lower the value of the first two digits; S3 and S4 are used to raise or lower the last two digits (which are displayed in the lower right-hand portion of display 13).

3. Configuration Display #3

In "Config. #3", one 2-digit number is displayed in the upper left-hand corner of display 13. Any switch S1–S4 can be used to raise or lower the value as desired.

4. Configuration Display #4

In "Config. #4", a 2-digit number is displayed in the upper left-hand corner of display 13. A function ON/OFF is displayed in the upper right-hand corner of display 13. Switches S1 and S2 are used to raise or lower the value of the number. Switches S3 and S4 are used to alternately toggle the display ON or OFF for control of a given function as described herein below. S5 is placed in position "F" for all Config. #4 programming.

PROGRAMMING IN CONFIG. #1

1. System Mode Demand

Switch S5 is placed in position "2" and the system mode demand number is displayed in the upper left-hand corner of display 13. This number represents the number of Zones 23–27 that must call for heating or cooling for the heating or cooling mode of operation to be selected. This number can be adjusted to between 1 and 4 zones using switches S1 and S2.

2. Heating Demand Qualifier

If the number of zones demanding heat is greater than the heating demand qualifier, the monitor 12 will operate the fan 20 from FAN-LO to FAN-HI as will be further discussed below. Switches S3 and S4 can be used to raise or lower the heating demand qualifier from 1 to 4 zones. The number is displayed in the lower right-hand corner of display 13 while S5 is in position "2".

3. High Temperature Trip Points

The fan-powered mixing box assembly 10 according to the present invention has three stages of heat represented by heating element 21: Heat-1; Heat-2; and Heat-3. There are two temperature trips, one for Heat-1 and another for Heat-2, and Heat-3. Both limits can be set within the range 105°-180° F. and utilize heater temperature sensor 54. With S5 in position "3", S1 and S2 are used to set the Heat-1 trip point which is displayed on the upper left-hand corner of display 13. The Heat-2 trip point is displayed in the lower right-hand corner of display 13 and is adjusted using switches S3 and S4. The most significant digit "1" is not displayed on the display 13 because all possible setpoints are above 100° F.

4. Heating Mode Lockout Temperature

The Heat mode of the fan-box 19 can be locked out when outside air temperature exceeds a certain limit. With S5 in position "4", this setpoint will be displayed in the upper left-hand corner of display 13 and can be adjusted using switches S1 and S2 to between 10°-80° F. in 5 degree increments. If it is desired to completely disable the Heat mode irrespective of outside air temperature, the display is adjusted using switch S2 to lower the setpoint to 0° F.

5. Supplemental Heat Lockout Temperature

If any of the zones 23-27 are equipped with a supplemental heat option, such as baseboard heaters, this heat option can be locked out when outside temperature exceeds a certain limit. With S5 in position "4", the supplemental heat option setpoint is displayed in the lower right-hand corner of display 13 and can be set using switches S3 and S4 to any setting between 10°-80° F. in 5 degree increments. S4 can be used to lower the setpoint to 0° F. if the heat option is to be disabled. This feature is controlled by a signal from monitor 12 to the respective zone thermostat having supplemental heat.

6. Maximum Ventilation Temperature

The monitor 12 can be operated in the ventilation mode when neither the heating or cooling mode is required. The maximum temperature setpoint, as measured by duct temperature sensor S3, during the ventilation mode is established by using switches S1 and S2 to set the reading in the upper left-hand corner of display 13 with S5 in position "5". The range of this setting is 65°-80° F. in 1 degree increments.

7. Minimum Ventilation Temperature

With S5 in position "5", the minimum temperature in the duct 43 during the ventilation mode is set using switches S3 and S4 with the setpoint displayed in the lower right-hand corner of display 13. Range of this setpoint is 40°-60° F. in 5 degree increments. The minimum ventilation temperature setpoint can be disabled by using S4 to lower the setpoint to 0° F. This option will allow the fan 20 to remain in FAN-LO regardless of minimum ventilation temperature as will be discussed below.

PROGRAMMING IN CONFIG. #2

8. Duct Temperature Sensor Calibration

Duct temperature sensor 53 can be calibrated by comparing the reading indicated on display 13 with that of a reference thermometer placed near the sensor 53. The temperature reading on the display 13 consists of two digits in the upper left-hand corner which are adjusted using switches S1 and S2 and a single number, representing tenths of a degree, in the lower right-hand corner which is adjusted using switches S3 and S4. The temperature is adjusted to match that of the reference thermometer. The A/D circuitry in U4 in the monitor 12 supplies a 10-bit word representative of the temperature consisting of 2-bits for the most significant digit (MSD) and 8-bits for the least significant digit (LSD). A 2-bit calibration word, 1 bit for MSD, 1-bit for LSD, is entered into the memory of the U-2 EEPROM for use in modifying the 10-bit word sent to the microcomputer U1. The 2-bit calibration word is created using switches S1-S4 by setting the reading on display 13 to be the same as that of the reference thermometer.

9. Pressure Sensor Calibration

With switch S5 in position "7", switches S1-S4 can be used to calibrate a pressure/airflow sensor 49 provided the sensor is of a given type. The calibration procedure is similar to that used with the duct temperature sensor calibration discussed above. The use of a pressure/airflow sensor option will be discussed in more detail below.

10. Maximum/Minimum Duct Pressure Limit

With switch S5 in position "8" the display 13 will show the setpoint for maximum duct pressure (Hi Limit). The readout will be from 0 to 2,047 counts in 1 count increments, 1 count=0.001 inch water column. The digits in the upper left-hand corner are the most significant; the digits in the lower right-hand corner are the least significant. Switches S1-S4 are used to set the desired limits.

Switch S5 is placed in position "9" for setting the minimum pressure limit (Lo Limit) in the same manner as for the Hi Limit.

PROGRAMMING IN CONFIG. #3

11. Set Device Address

Switch S5 is placed in position "1", and a 2-digit number from 01 to 64 is displayed in the upper left-hand corner of display 13. Any switch S1-S4 can be used to set the address of fan-box monitor 12 for purposes of communication. All devices on the communications bus 44 have an address. The monitor 12 is given the highest number.

PROGRAMMING IN CONFIG. #4

12. Local Setback Control

The monitor 12 can be programed to follow its own setback program or follow that of another communication device such as a computer with switch S5 in position "F", switches S1 and S2 are used to enter the number "1" onto the upper left-hand corner of display 13. Switch S5 is now in the "F1" position function. Switches S3 and S4 can be used to toggle ON or OFF (annunciators displayed in upper right) the function whereby the monitor 12 will follow (1) "Setback" and "Comfort" programs in memory—ON displayed—or (2) will follow the Setback/Comfort programs of another device on the communication bus 44 (OFF displayed).

13. Setback Programming Lock

With S5 in position "F" and "02" entered via S1 and S2 on display 13, function "F2" is created. Monitor 12 can be locally programmed to set the time periods associated with comfort and setback modes of operation. When the setback programing lock is toggled ON via S3 and S4, the local time period programing of monitor 12 is disabled and the time periods are established via communication bus 44. When the lock is OFF, the time periods can be established locally or via communication bus 44.

14. Ventilation Mode

In addition to the heating and cooling mode, the fan-box monitor 12 can be operated in the ventilation mode when any of the associated slave thermostats 34–37 is in the comfort—as opposed to setback—mode. This featured is toggled ON with S5 in "F" and "03" entered on the display 13. When S3 and S4 are used to toggle the mode OFF, the fan-box monitor 12 cannot select the ventilation mode.

15. Celsius Temperature Display

With S5 in "F" and "04" entered on display 13, S3 and S4 can toggle ON or OFF the readout of the display 13 in °C. (ON) or in °F. (OFF).

16. Outside Air Temperature Sensor

With S5 in "F" and "05" entered on display 13, an outside air temperature sensor 52 can be used when this function is ON. When this function has been toggled OFF via switches S3 and S4, fan-box monitor 12 is programed to receive data indicating outside temperature from another device on the communication bus 44.

17. Fan Only First Stage Heat

The monitor 12 can be programed to provide that only the fan 20 will be energized when first stage heat is otherwise selected (as will be discussed below). With S5 in "F" and "06" entered via S1 and S2, this option can be toggled ON or OFF as desired.

18. Supplemental Heat Callers

The fan-box monitor 12 allows slave thermostats 33–37 to be considered as "Zone Heating Callers" when their respective supplemental heat source is energized. This option can be toggled ON via Function "F7" by placing S5 in "F" and entering "07" on display 13. S3 and S4 are used to toggle this option ON or OFF.

19. High Torque Actuator/Damper Rotation Direction

Different types of actuators may be used in the present invention for operation of the damper 11. If a high torque actuator is used, S5 is placed in "F" and "08" is entered on the display 13. This feature is toggled ON via S3 and S4.

The damper 11 can be operated in either a clockwise or counterclockwise manner to open it. In function "F9", ON is clockwise rotation, OFF is counterclockwise.

20. 2400 Baud Rate

Data transmission over Bus 44 can be at 2400 Baud ON or 4800 OFF and is set in Function "F10".

21. Supplemental Heat Fan Relay

When the system is not in either the heating or cooling mode, the fan 20 is energized in FAN-LO anytime a slave thermostat 33–37 energizes its associated supplemental heat when this option is ON (Function "F11").

22. Temperature Trend

As will be explained in more detail below, the fan-box monitor 12 not only receives data from the slave thermostat 33–37 as to zone demand but also monitors the "Temperature Trend" in the various zones 23–27 calling for the heating mode. With S5 in "F" and "12" entered on the display 13, "Temperature Trend Staging" can be toggled ON to energize second stage heating when the "Reference Zone Temperature Trend" is positive or zero for six minutes continuously. When this feature is OFF, second stage heating is energized when the reference zone has a heating demand of 2.0° F. or greater.

OTHER PROGRAMMED FEATURES

23. System Mode Reselect

If the fan-box monitor 12 has activated the system in either the heating or cooling mode and zones 23–27 have zone thermostats 33–37 simultaneously calling for heating and cooling for a given length of time—the mode reselect time—the system must reselect the mode of operation and can change mode. The mode reselect time can be set for 0–2550 minutes in 10-minute increments with S5 in position "A". The setpoint is adjusted via communication Bus 44 from another device (such as a central computer). If the setting is at 0 minutes, the mode reselect is disabled.

24. Communication Check

With S5 in position "E", the monitor 12 will perform a communications check with each device on Bus 44. The following information is provided for each device:

Device, address; whether it is a heating caller or cooling caller; indication if the device is a reference zone and if so, whether demand in that zone is less than 1.5° F.; and, operating error signals. For example, display 13 may have "04" in the upper left and "on" in upper right indicating that the device at address 04 is under a communication check. "04" is selected via S1 and S2; the check is toggled ON via any switch S1–S4.

COMFORT/SETBACK CONTROL

The monitor 12 can be programmed to operate the associated system in the normal or "comfort" mode for those days and times when the various zones 23–27 are occupied and operate in the "setback" mode for non-occupied days and times such as the weekends and nights. When the monitor 12 is in the setback mode the display 13 will display the word SETBACK in the upper right-hand corner. There is no annunciator for the comfort mode.

To program the comfort/setback modes, the monitor cover 12a is removed exposing switches S1–S4, S5 and S6. For purposes of this programming step the following switch designations are used: switch S1 is ADVANCE TIME; S2 is COPY; S3 is ON/OFF; S4 is DAY SELECT; and S6 is PROGRAM BUTTON. S5 is in normal (position "0").

Depress the PROGRAM BUTTON to activate the "Program Mode". Press the DAY SELECT button to enter the correct day which are designated as follows: Monday=1 to Sunday=7. Press the ON/OFF button to display ON. Press ADVANCE TIME until the time for the beginning of the comfort mode is displayed. Press the ON/OFF button to OFF. Now depress the ADVANCE TIME button until the time for the beginning of the setback mode is displayed on display 13. The beginning of the setback mode is set as the end of the comfort mode.

At this point the comfort and setback periods for the day selected are entered in the monitor 12. A second set of comfort and setback periods for any day can also be programmed by repeating the above steps.

To exit the program mode press the PROGRAM BUTTON. If no further adjustments are made for 30 seconds, the above programs are entered in memory for monitor 12 operation.

To erase the daily program periods simply select the day to be erased and simultaneously press either the ADVANCE TIME and COPY buttons or the ON/OFF and DAY SELECT buttons.

To copy a program from one day to another day, press the COPY button after selecting the day to receive the new program periods. The program periods from the day previous to that currently displayed will be read into the memory for the current selected day.

Setback and comfort modes work in conjunction with time data from real time clock 14 or received time from other device via communication Bus 44.

MODES OF OPERATION

The fan-box monitor 12 periodically receives data from the zone thermostats 33-37 via communication Bus 44. If any thermostat has zone temperature more than 1.5° F. from its associated set point it becomes either a "Heating Caller" or "Cooling Caller". The fan-box monitor selects the cooling mode if the number of cooling callers equals or exceeds the system mode demand number as programmed and selects the heating mode if the number of heating callers equals or exceeds the system mode demand number. If the number of zone callers for heating and cooling are equal and they both equal or exceed the system mode demand number, the monitor 12 selects the mode matching the zone caller which as the greatest demand (measured in °F.). If the number of heating and cooling callers each equal or exceed the system mode demand number but are not equal to each other, the majority rules.

Once a mode has been selected, the zone 23-27 that has the greatest demand will be selected as the "Reference Zone". The system will be operated by the monitor 12 until either (1) the reference zone has a demand less than 0.5° F. or (2) system mode re-select selects the opposite system mode. The reference zone can change when the system is in a given mode so that it is always the zone with the greatest demand.

COOLING MODE OPERATION

Once the fan-box monitor 12 selects the cooling mode, it will modulate the damper 11 until system static pressure equals the minimum pressure setpoint or until the full open position is reached. If the cooling mode is "Released" due to the reference zone having demand of 0.5° F. or less, the damper 11 is fully closed until the same or another mode is selected.

If during system operation, the static pressure reaches the maximum pressure setpoint, the damper 11 is modulated closed.

The fan-powered mixing box does not have its own source of cooling and thus the system herein described must be supplied cool air from an HVAC Unit. The fan-box monitor 12 will not select the cooling mode unless the central unit is in the cooling mode when a particular system configuration is used that need not be further discussed in this application.

HEATING MODE OPERATION

As discussed above, the monitor 12 will select the heating mode when a sufficient number of heating callers exist for operation in this mode.

1. FAN ONLY 1st STAGE HEAT IS ON

If the "Fan Only" is used for the first stage of heating, fan 20 will be operated in FAN-LO. HEAT-2 will be energized when the reference zones demand reaches 2.0° F. or greater if "Temperature Trend Staging" is OFF. If HEAT-2 is operating and the reference zone heating demand is 2.5° F. or greater the HEAT-3 stage will be energized.

2. FAN ONLY 1st STAGE HEAT IS OFF

If the "Fan Only" option was set to OFF, the monitor 12 will energize the fan 20 in FAN-LO and energize the HEAT-1 stage of heating element 21. If the reference zone has a demand of 2.0° F. or greater, HEAT-2 stage will be energized if "Temperature Trend Staging" is OFF. If HEAT-2 is energized and the reference zone has a demand of 2.5° F. or greater, HEAT-3 will be energized.

3. FAN OPERATION DURING THE HEATING MODE

When the heating mode is initially selected, fan 20 will be operated in FAN-LO for one minute. After the one minute waiting period during which the system is stabilized, the monitor 12 will compare the number of heating callers to a minimum demand number as the "Heating Demand Qualifier". The fan 20 will remain in FAN-LO if the number of zones 23-27 calling for heat is less than the heat demand qualifier. If the number of heating callers is greater than the heat demand qualifier, the fan 20 will be operated in FAN-HI and will remain in this speed until both of the following conditions exist: (1) the number of heating callers is less than the heat demand qualifier and (2) system static pressure is greater than the maximum pressure setpoint.

4. TEMPERATURE TREND STAGING

When the heating mode is initially selected it may occur that the temperature condition in the selected reference zone is improving. The HEAT-2 stages need not be energized in this situation if the situation is improving quickly enough. Temperature trend staging provides a means to prevent unnecessary energization of HEAT-2 and thus allows for more economical operation of the mixing-box assembly 10 without sacrificing comfort in any zone 23-27. Equally important, temperature trend staging allows for a determination of whether zone conditions are getting worse.

When ON temperature trend staging works as follows: When the reference zone has a demand of 2.0° F. or greater, the initial value of the temperature trend (TT) is set to zero. Approximately every 12 seconds, the monitor 12 performs a temperature trend calculation to determine a new temperature trend value. This value is arrived at by determining the difference between current demand (Cmd) and previous demand (Pmd)=Cmd-Pmd. This difference is added to the TT(OLD) to get TT(NEW). If TT(NEW) is negative, zone conditions are improving. If TT(NEW) is zero, zone conditions are not improving. If TT(NEW) is positive, zone conditions are worsening. The fan-box monitor 12 will energize HEAT-2 if the reference zone's TT(NEW) is continuously positive or zero for six minutes.

Assume that initial zone demand in the reference zone was 3.0° F. (TT=0). If zone demand decreases to 2.5° F., TT(NEW) is negative. Now assume that zone demand increases to 2.7° F. TT(NEW) will still be negative even though the zone condition is worsening. In this special case, programming will replace the negative TT(NEW) with only the difference between Cmd and Pmd, which in this case will be positive (+0.2). Operation of the monitor 12 will then proceed as described above.

VENTILATION MODE OPERATION

If neither the heating or cooling mode is selected, the fan-box monitor 12 can operate the damper 11 in the ventilation mode. In this mode, the fan 20 is operated in FAN-LO and damper 11 is modulated open to keep duct temperature below the maximum ventilation temperature setpoint.

1. DAMPER MODULATION

When the ventilation mode is selected, monitor 12 will initially close damper 11 and energize fan 20 in FAN-LO for one minute. After one minute, if duct temperature is 1.5° F. greater than the maximum ventilation temperature setpoint, the damper 11 will be opened. The damper 11 will continue to open the damper 11 until duct temperature is reduced to within 1.5° F. of the maximum temperature setpoint. When the duct temperature drops to less than 1.5° F. above the maximum setpoint, the damper 11 is closed.

To maintain air pressure within the operating limits, the monitor 12 will modulate damper 11 closed if static system pressure is greater than the maximum pressure setpoint. During operation of the damper 11, the monitor 12 will not exceed the maximum pressure setpoint to maintain the maximum ventilation temperature setpoint.

During the ventilation mode, if duct temperature is below the minimum ventilation temperature setpoint the fan 20 is deenergized. If, after one minute, duct temperature exceeds the minimum ventilation setpoint, the fan 20 will be energized in FAN-LO.

Figure 5:
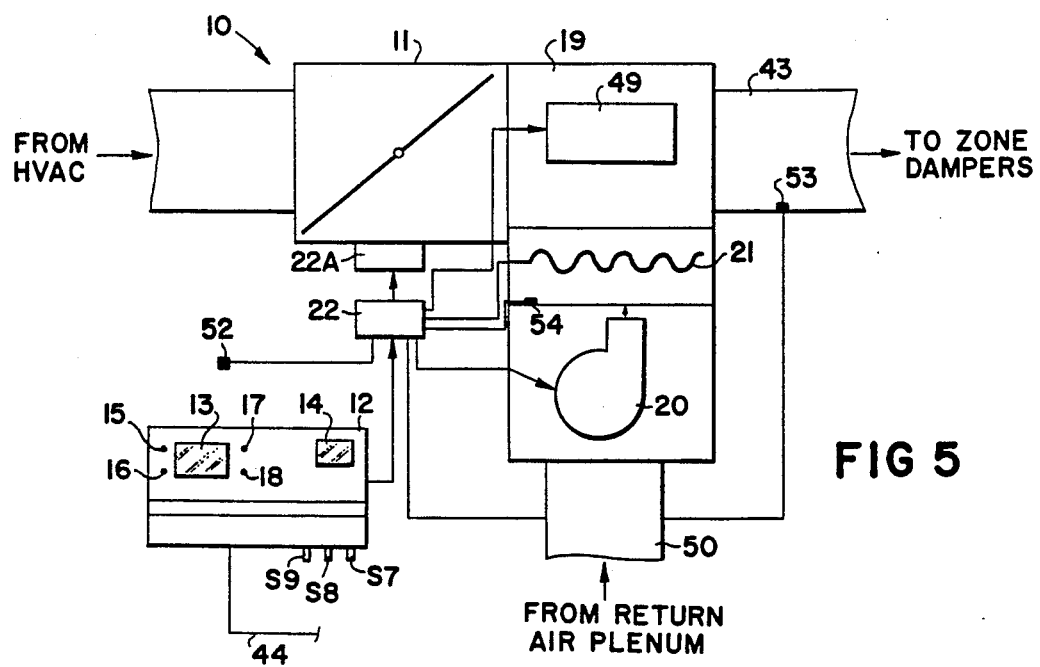
FIG. 5 is a pictorial diagram of the fan-powered mixing box assembly in accord with the present invention used with an optional air flow sensor.
Figure 6:
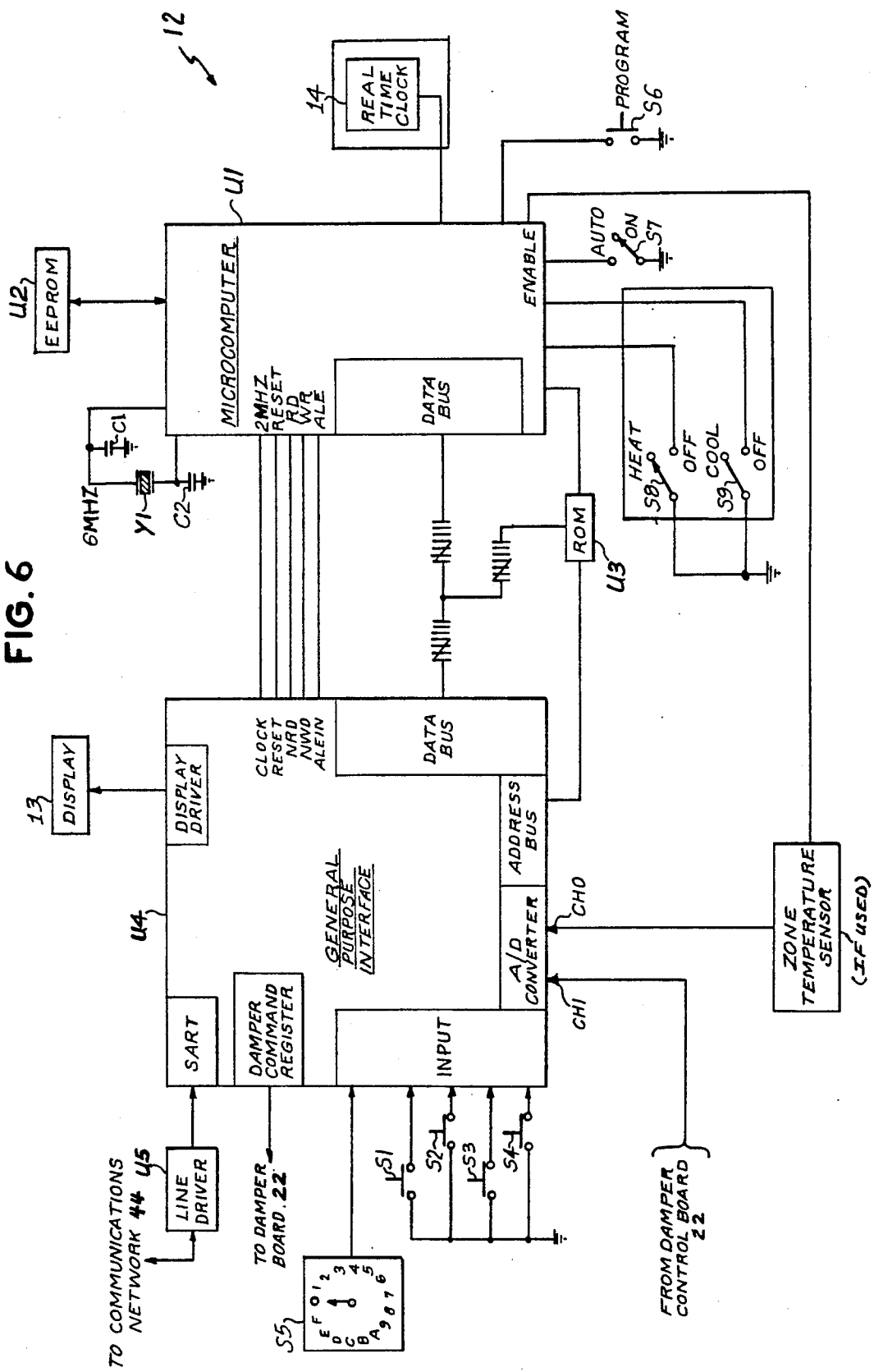
FIG. 6 is a simplified block diagram of the electronic circuitry of the fan-box monitor used in the invention.

FIG. 2 illustrates the basic configuration of the fan-powered mixing box assembly 10 without an air pressure sensor used. FIG. 5 illustrates the placement of air pressure sensor 49 in series with air flow through trunk duct 43.

FIG. 4 illustrates the use of the fan-powered mixing box assembly 10 providing air to a duct 43 controlled by a VVT bypass controller such as that described in our copending application entitled "Bypass Controller And Bypass System". In this application, the bypass controller utilizes its own air flow/pressure sensor 46 with its associated damper 47 and damper board 48. Bypass controller 45 is also on communication bus 44 for connection to monitor 12.

As understood in the art, the particular configuration used in a system depends upon the number and size of zones 23-27 which are to be supplied by a given fan-powered mixing box assembly 10.

Real time data from clock 14 or received via communication bus 44 is utilized by the monitor 12 for comfort and setback modes of operation. In addition, monitor 12 will broadcast time data to zone thermostats 33-37 for use system operation. (For example, the thermostats 33-37 follow their own setback programs or can be programmed to follow monitor 12, as described in the "Method And System For Controlling A Single Zone HVAC Supplying Multiple Zones" application referenced above.)

As discussed above in the section entitled "Programming The Monitor", each zone thermostat 31-37 may employ supplemental zone heating sources. Two features of the monitor 12 can be made operative if supplemental heat is used with a given thermostat 33-37. When the monitor 12 is not in the heating, cooling, or ventilation mode, fan 20 can be energized in FAN-LO when any thermostat 33-37 energizes its supplemental heat sources. In addition, when any zones thermostat 33-37 energizes its supplemental heat, the thermostat 33-37 may be considered a heating caller regardless of zone demand.

DIAGNOSTICS

Finally, the fan-box monitor 12 employs programming diagnostics to display error data on display 13. Such error data includes system errors such as temperature or pressure sensors out of the operating range and errors regarding the movement of damper 11. Also included in diagnostics is information indicating whether supply air temperature to the fan-powered mixing box assembly 10 is out of the range required for proper overall system operation.

Figure 8:
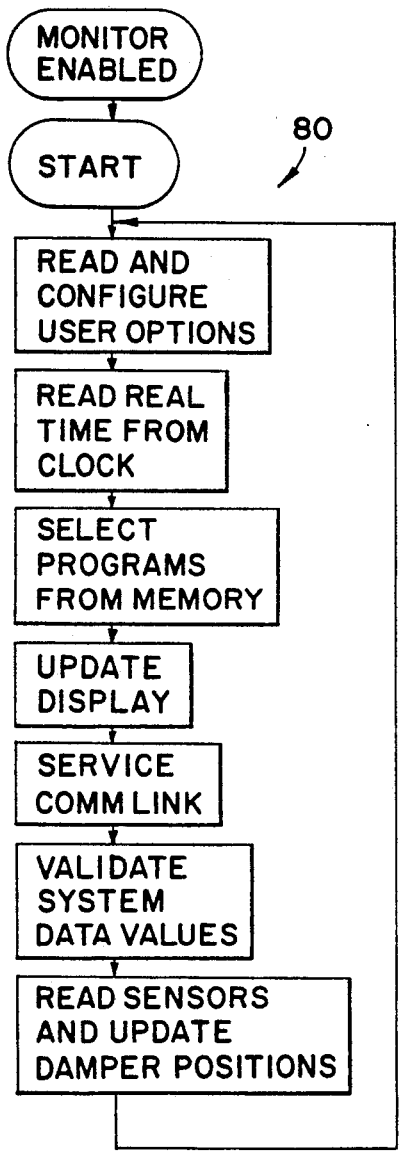
FIG. 8 is a simplified flow chart of the main control loop of the fan-box monitor.

FIGS. 8-15 include simplified flow charts illustrating the operation of selected programs of monitor 12. FIG. 8 illustrates the main control loop which includes the codes and data, including real time, that are used to select the appropriate program based upon the time and user-installed variables that were entered into the device 12 during the programming of the device. As understood in the art, the stages of each program are sequenced by the monitor microprocessor based upon the exact microprocessor and machine code used. The blocks labeled "Return" mean "Return to Main Control Loop" as understood in the art.

Figure 9:
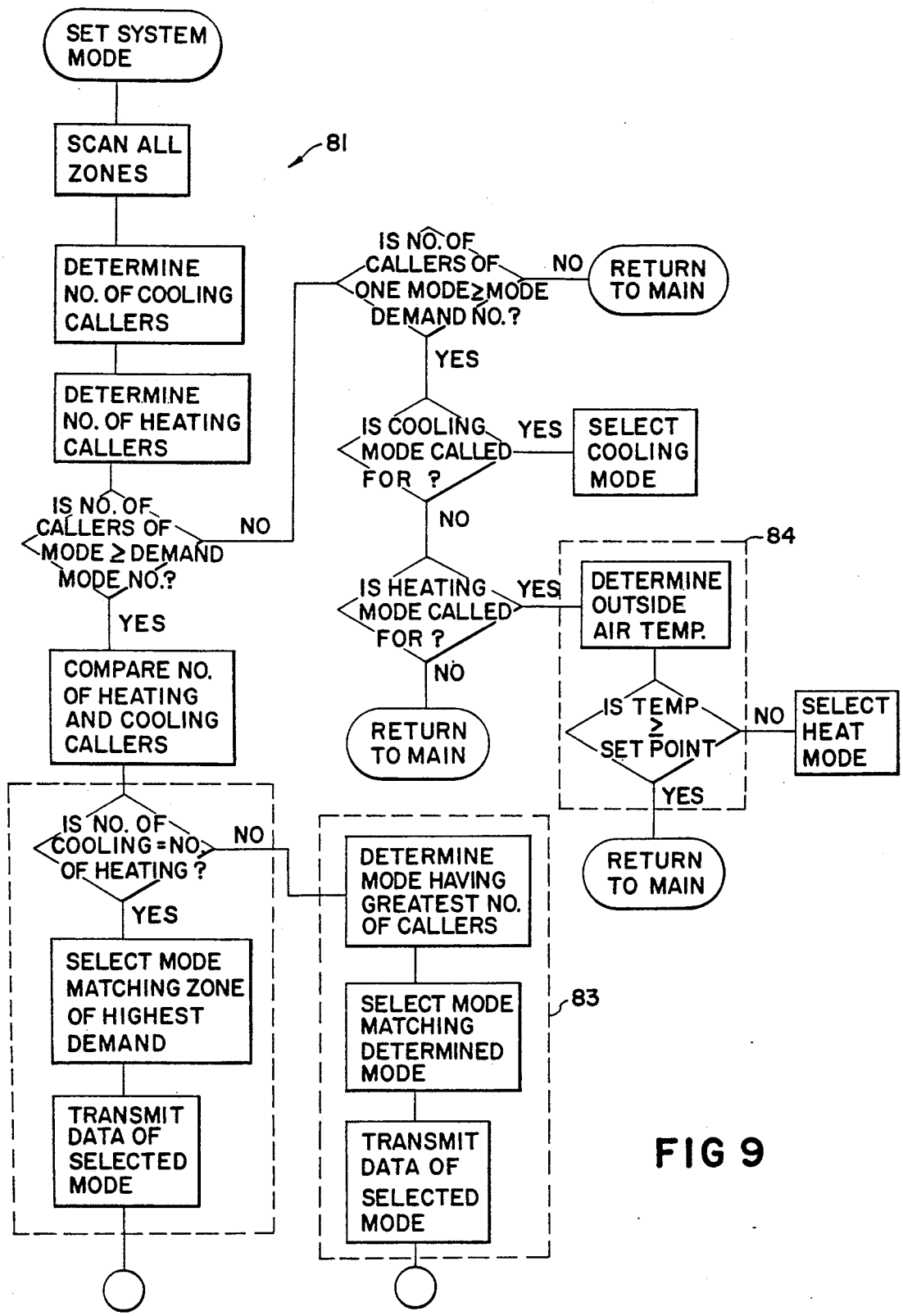
FIG. 9 is a simplified flow chart of the mode selection program.

FIG. 9 is a simplified flow chart for the selection of either the heating or cooling mode. The program 81 that is represented includes program 82 which is used in the case where the number of heating and cooling callers are equal and both are equal to or greater than the mode demand number. In such case the mode matching the highest demand is selected. Otherwise, the majority rules under program 83. FIG. 10 illustrates the fact that when zones are scanned the actual demand in each mode is also determined. Program 84 illustrates the lockout feature used for the heating mode when outside temperature exceeds a user-selectable setpoint.

Figure 14:
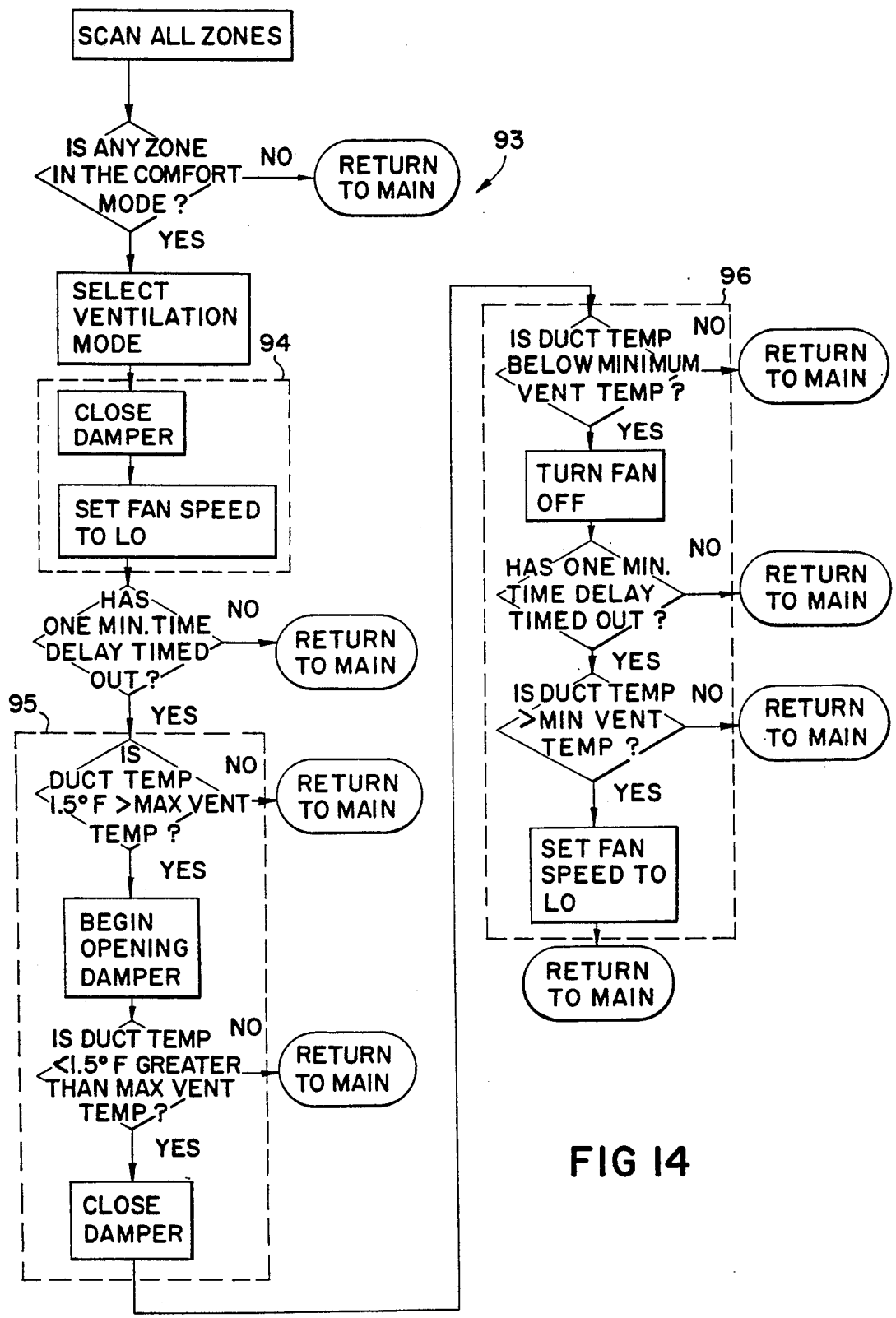
FIG. 14 is a simplified flow chart of programs used in the ventilation mode.

In the event that neither heating or cooling mode is selected and assuming that the zones are not in "setback" i.e., at least one zone is in the "comfort" mode, the ventilation program 93 of FIG. 14 may be run. Programs 95 and 96 indicate damper and fan control in the ventilation mode. FIG. 11 indicates the program 88 for damper/pressure control in the cooling mode.

Figure 12:
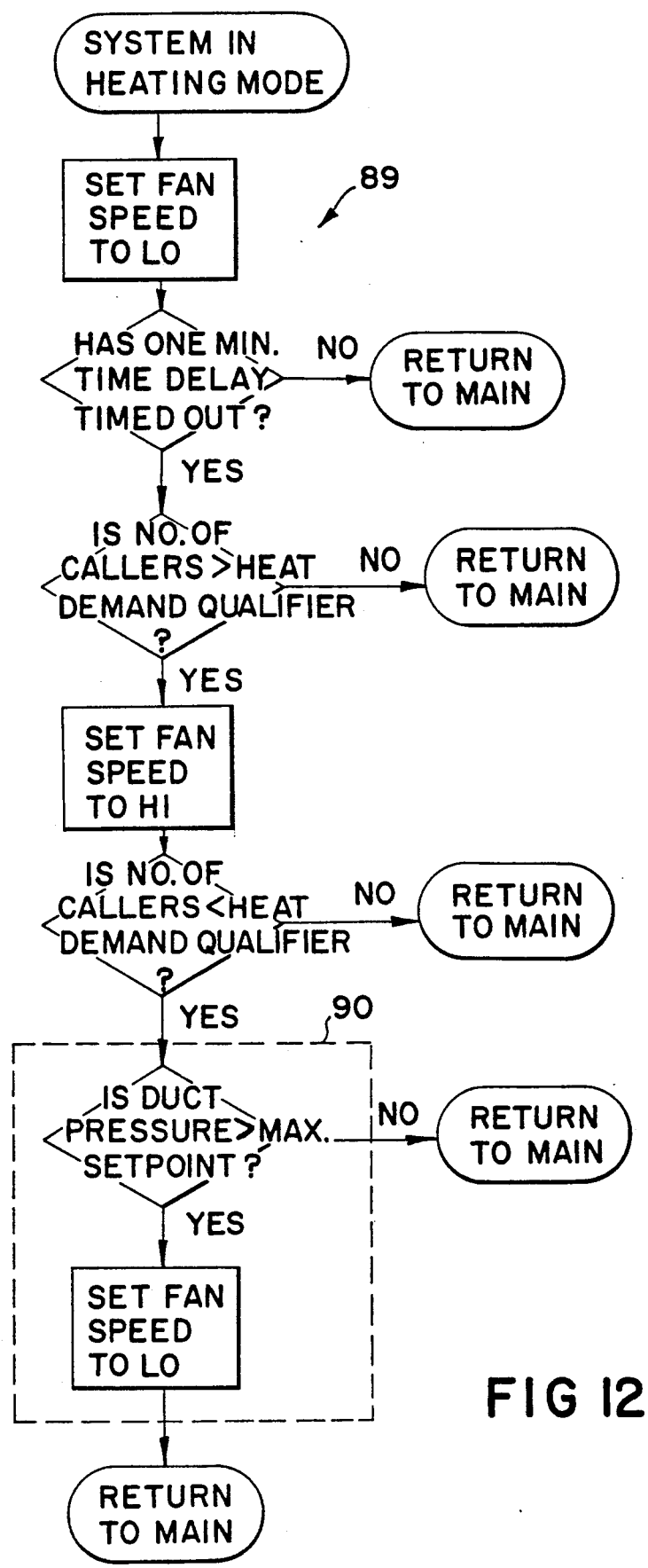
FIGS. 12-13 are simplified flow charts of programs used in the heating mode.
Figure 13:
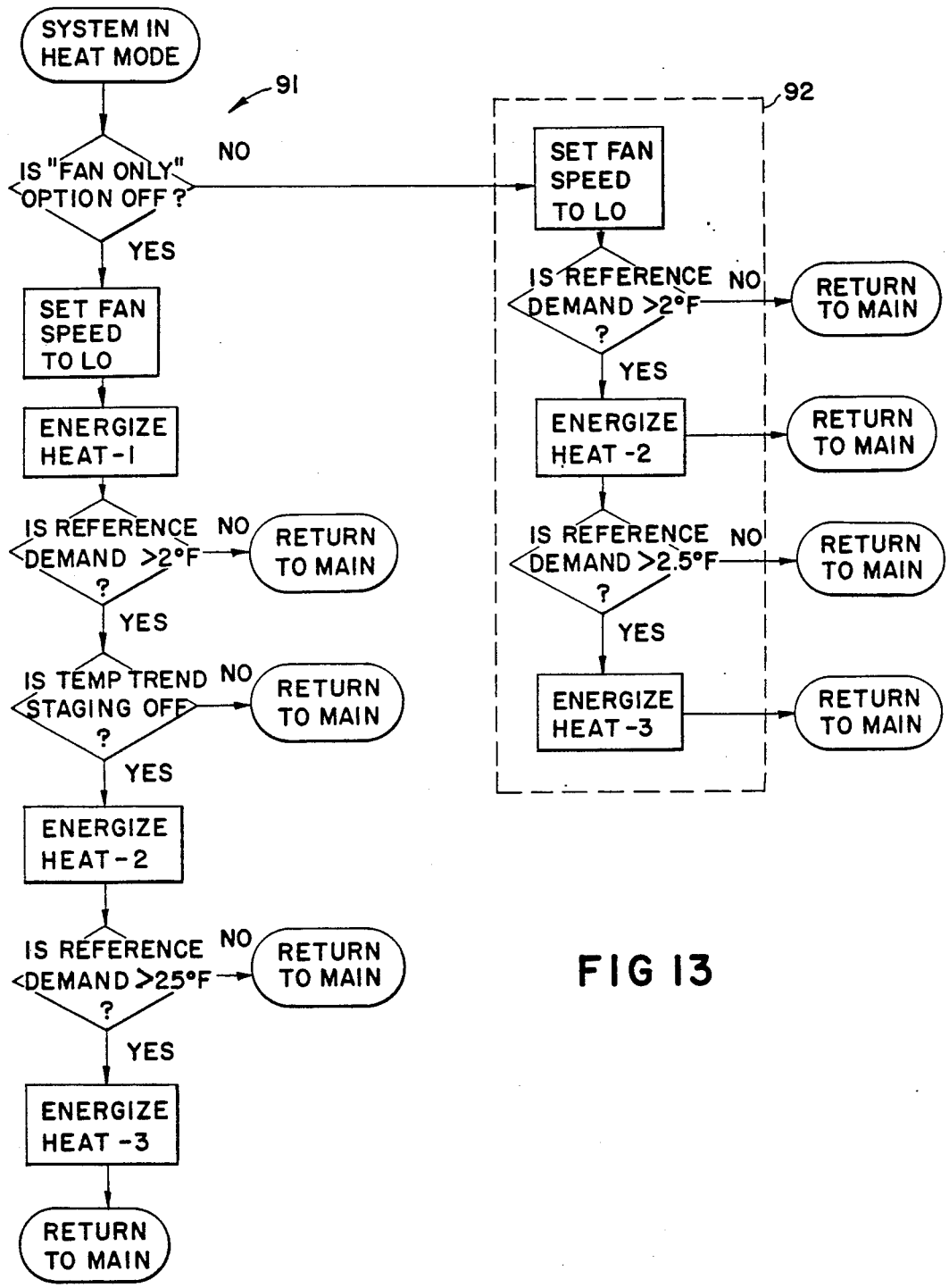

FIGS. 12 and 13 indicate the programs used in the heating mode. Program 89 is used for coordinating fan control with the heat demand qualifier with a pressure limit of program 90 to set the fan to LO if the pressure setpoint is exceeded. In FIG. 13, program 91 illustrates the control of multiple heating elements with or without the "Fan-Only" option used instead of the first stage of heat. Program 92 illustrates the "Fan-Only" option.

Figure 15:
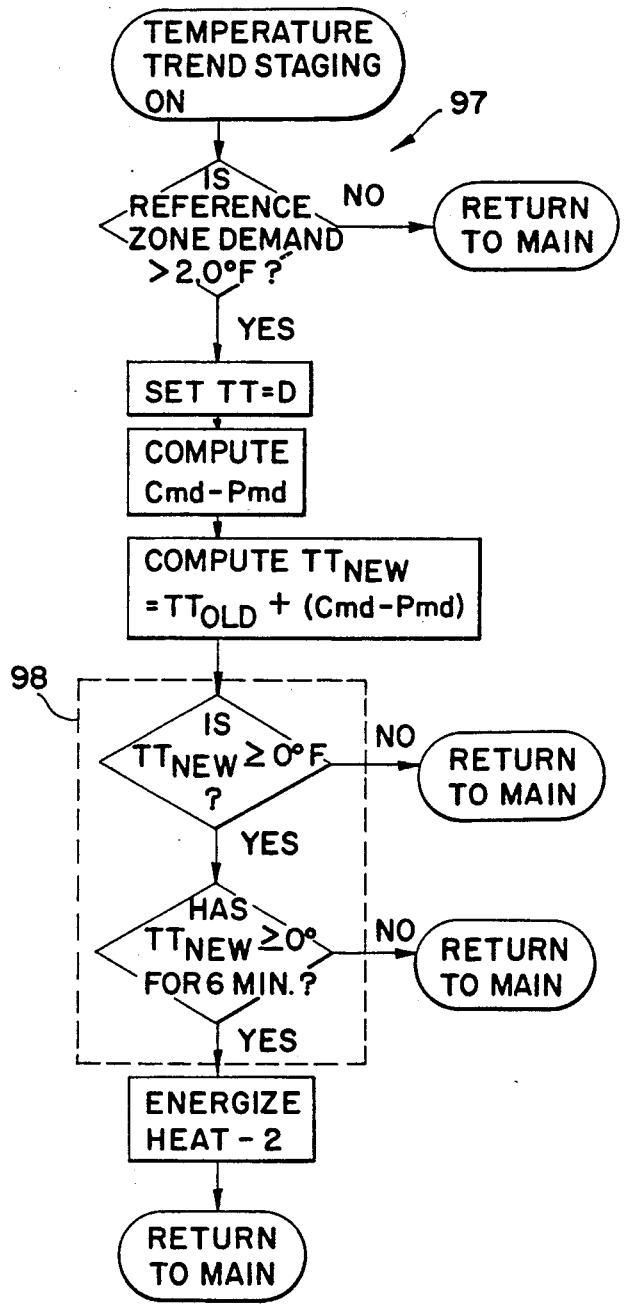
FIG. 15 is a simplified flow chart of the temperature trend calculations.

Finally, FIG. 15 indicates the temperature trend computation program 97. Program 98 includes the essential decision blocks involved in using temperature trend staging including the mathematical reset of TT(new) when a "roller-coaster" temperature profile has occurred as discussed hereinabove.

The programmable fan-box monitor means determines the demand for heating or cooling from all zone thermostats, determines the number of zones having demand for heating or cooling, compares such number with a preselected number defining the system demand number, and if the number of zones demanding heating or cooling equals or exceeds the system demand number, the fan-box monitor means selects the desired heating or cooling mode respectively of the fan-powered mixing box assembly and provides output signals to all zone thermostats for operating respective zone damper means. The fan-box monitor means operates the fan-powered mixing box assembly in the selected mode until all zone thermostats demanding the selected mode have been substantially satisfied. The fan-box monitor means has a first program means such that the fan-powered mixing box assembly is operated in a ventilation mode when the demand for heating or cooling from all zones is less than the system demand number. The fan-box monitor means compares the number of zones having a demand for heating and cooling, and if the number of zones having a demand for heating is equal to the number of zones demanding cooling and such numbers equal or exceeds the system demand number, the fan-box monitor means selects the zone with the greatest demand as a reference zone and operates the fan-powered mixing box assembly in the mode coincident to that demanded by the reference zone until the reference zone is substantially satisfied. The fan-box monitor means periodically determines the demand from each zone and, if the demand in another zone, having a demand coincident with the mode in which the fan-powered mixing box is operating is greater than the reference zone, the other zone is selected as a new reference zone and the fan-powered mixing box assembly is operated until demand in the new reference zone is substantially satisfied. The fan-box monitor means receives data from the reference zone when the fan-powered mixing box assembly is operated in the heating mode. The fan-box monitor means provides an output signal to the fan-powered mixing box assembly for energizing the heating element in accordance with the demand of the reference zone.

The fan-box monitor means includes a first program means such that when the number of zones demanding heat exceeds a predetermined number defining the heating demand qualifier number, and the fan includes a multi-speed motor, the fan-box monitor means provides an output signal to the fan-powered mixing box assembly for increasing the speed of the fan motor. In other aspects the fan-box monitor means also includes a first sensor for determining the temperature of air adjacent the heating elements and de-energizes the heating elements of the fan-powered mixing box assembly if the air temperature exceeds predetermined setpoints established by the fan-box monitor means. The fan-box monitor means includes indicating means for providing data indicative of the information associated with the operation of the fan-powered mixing box assembly. The fan-box monitor means also includes a first sensor for determining the temperature of outside air. In this aspect of the invention, the fan-box monitor means includes a first program means such that when the fan-box monitor means receives a signal from the first sensor indicating outside air temperature is greater than a predetermined value, the fan-box monitor means maintains the heating elements in off condition even if demand therefor is called for by any zone. Each zone may have a heating source independently controlled by the zone thermostat and the fan-box monitor means includes a first program means such that when the fan-box monitor means receives a signal from the first sensor indicating outside air temperature is greater than a predetermined value, the operation of the heating source by the zone thermostat is disabled by a signal from the fan-box monitor means to the zone thermostat.

Further aspects are seen wherein the fan-box monitor means includes a second sensor for determining the temperature of air in the main duct supplying air to the zone ducts. The fan-box monitor means further includes a second program means such that when the fan-powered mixing box assembly is operated in the ventilation mode, the fan-box monitor means will operate the master damper and the fan motor to maintain main duct temperature within predetermined setpoints as established by the fan-box monitor means. The fan-box monitor means also includes a sensor for determining the air pressure in the main duct and a first program means such that the fan-box monitor means operates the master damper to maintain duct air pressure within predetermined setpoints as established by the fan-box monitor means. The fan-box monitor means includes a program means such that when the heating mode has been selected by the fan-box monitor means, the fan motor is energized and the heating element is not energized unless the heating demand exceeds a predetermined level established by the fan-box monitor means. If the motor of the fan has been energized in low speed, the fan-box monitor means will compare the number of zones demanding heat with a predetermined number defining the heating demand qualifier number established by the fan-box monitor means and the number of zones equals or exceeds the heating demand qualifier number the motor will be operated in high speed. The fan-box monitor includes a sensor for determining the air pressure in the main duct, the fan-box monitor means further includes program means such that when the fan-box monitor means is operating the motor in high speed, the motor will remain operating in high speed until the number of zones demanding heat is less than the heating demand qualifier number and the air pressure in the main duct is greater than a maximum predetermined setpoint as established by the fan-box monitor means.

Additional aspects relate to the fan-box monitor means as including a program means such that when the fan-box monitor means is actuated in the heating mode, the zone having the greatest demand for heating is chosen as a reference zone, the fan-box monitor means providing output signals to the fan-powered mixing box assembly for energizing the heating element in accordance with the demand of the reference zone. When heating demand in the reference zone exceeds a first predetermined value the fan-box monitor means will provide an output signal to the fan-powered mixing box assembly for increasing the heating supplied to the reference zone by the fan-powered mixing box assembly.

The fan-box monitor means includes a means for monitoring the temperature trend in the reference zone such that the fan-box monitor means will not provide an output signal to the fan-powered mixing box assembly for increasing the heating supplied to the reference zone when the temperature trend in the reference zone indicates that the heat demands of the reference zone are being substantially satisfied. In the heating zone the fan-box monitor means selectively controls the heating element in response to the temperature trend.

In accord with the present invention, a method is provided for controlling the operation of a plurality of zone duct damper means located in respective zone ducts and a fan-powered mixing box assembly controlled by a programmable fan-box monitor that supplies heated or cooled conditioned air into a main duct having a master damper means in the main duct which communicates with zone ducts associated with respective zones and each having a zone thermostat associated with the respective zone and controlling its zone damper means comprising the steps of (A) determining the demand for heating or cooling from all the zone thermostats; (B) determining the number of the zones having a demand for heating or cooling from all the zone thermostats; (C) selectively preselecting the number of the zones having demand for heating or cooling that is necessary to select a heating or cooling zone; (D) comparing the numbers obtained from steps (B) and (C) and selecting the heating or cooling mode when the number of the zones having a demand for heating or cooling respectively is equal or greater than the number selected in step (C); (E) operating the appropriate zone damper means to closed position if the zone thermostat controlling the appropriate dampers have no demand or demand a mode different than the mode selected in step (D), and positioning open the other zone dampers; (F) actuating the fan-powered mixing box assembly in the selected mode and operating the master damper until all zone thermostats demanding the selected mode have been satisfied; (G) deactivating the fan-powered mixing box assembly; and (H) repeating steps (A)–(G) for the other mode when demand for the other mode has been selected in accord with steps (A)–(D). The method may include in step (E) the step of (I) actuating some of the zone dampers to a partially open position depending upon the amount of demand by their respective thermostats and modulating such dampers between open and closed until the demand is satisfied. The method further comprises the steps of (J) comparing the number of demands after steps (A)–(D) and if the demands for heating and cooling are equal, the zone with the greatest demand is chosen as the reference zone and the fan-powered mixing box assembly is activated in step (F) in the mode coincident with the demand of the zone with the greatest demand; and (K) increasing or decreasing the heating output of the fan-powered mixing box assembly by the fan-box monitor in accordance with the demand of the reference zone.

The method may also comprise the steps of (L) determining the temperature in the heating compartment of the fan-powered mixing box assembly; and (M) deactivating the heating output of the fan-powered mixing box assembly by the fan-box monitor if the heating compartment temperature exceeds predetermined setpoints established by the fan-box monitor. The method also comprises the steps of (N) determining the number of zones demanding heating; and (O) increasing the speed of the fan in the fan-powered mixing box assembly when the number of zones demanding heating exceeds a predetermined number as established by said fan-box monitor and may include the step of (P) activating the fan-powered mixing box assembly by the fan-box monitor in the ventilation mode when the number of zones demanding heating and cooling is less than a predetermined number as established by the fan-box monitor. Further aspects of the method include the steps of (Q) determining the outside air temperature outside the zones; and (R) deactivating the fan-powered mixing box assembly by the fan-box monitor when the outside air temperature is greater than a predetermined value as established by said fan-box monitor as well as the steps of (S) determining the air pressure in the main duct; and (T) operating the master damper means by the fan-box monitor to maintain air pressure within setpoints as established by the fan-box monitor.

In another aspect of the invention, the method comprises the steps of (U) programming the setpoints of the zone thermostats during a plurality of distinct time periods; (V) determining the real time; and operating the system as hereinbefore described.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. In a system employing a unit for controlling the condition of air supplied to a plurality of zones via a main duct when using a fan-powered mixing box assembly in said main duct and having a fan and at least one heating element for heating air supplied to said main duct to supply conditioned air to each said zone via a master damper means in a zone duct communicating between said main duct and each said zone, and means for controlling said assembly comprising a programmable fan-box monitor means, said programmable fan-box monitor means receiving information from a controller means located in each zone interfaced with and controlling respective said zone damper means in respective said zone duct, means for determining the condition of the air in each said zone and supplying such information to said fan-box monitor means, said fan-box monitor means operating said fan-powered mixing box assembly in accordance with its programming, and the condition of air in each zone, and in accordance with the information received from each said controller means to control said fan-powered mixing box in a heating and cooling mode.

2. In the system as defined in claim 1 wherein said fan-box monitor means includes a first sensor for determining the temperature of air adjacent said heating elements and de-energizes said heating elements of said fan-powered mixing box assembly if said air temperature exceeds predetermined setpoints established by said fan-box monitor means.

3. In the system as defined in claim 1 wherein said fan-box monitor means includes indicating means for providing data indicative of information assocated with the operation of said fan-powered mixing box assembly.

4. In the system as defined in claim 1 wherein said fan-box monitor means includes a first sensor for determining the temperature of outside air.

5. In the system as defined in claim 4 wherein said fan-box monitor means includes a selectable first program means such that when said first program means is selected and said fan-box monitor means receives a signal from said first sensor indicating outside air temperature is greater than a predetermined value, said fan-box monitor means maintains said heating elements in off condition even if demand therefor is called for by any said zones.

6. In the system as defined in claim 4 wherein at least one said zone has a heating source independently controlled by said zone thermostat, said fan-box monitor means includes a selectable first program means such that when said first program means is selected and said fan-box monitor means receives a signal from said first sensor indicating outside air temperature is greater than a predetermined value, the operation of said heating source by said zone thermostat is disabled by a signal from said fan-box monitor means to said zone thermostat.

7. In the system as defined in claim 1 wherein said fan-box monitor means includes a first program means such that when said fan-box monitor means is actuated in the heating mode, the zone having the greatest demand for heating is chosen as a reference zone, said fan-box monitor means providing output signals to said fan-powered mixing box assembly for energizing said heating element in accordance with the demand of said reference zone.

8. In the system as defined in claim 7 wherein said fan-box monitor means includes a selectable second program means such that when said second program means is selected and heating demand in the reference zone exceeds a first predetermined value, said fan-box monitor means will provide an output signal to said fan-powered mixing box assembly for increasing the heating supplied to said reference zone by said fan-powered mixing box assembly.

9. In the system as defined in claim 8 wherein said fan-box monitor means includes a selectable third program means for monitoring the temperature trend in said reference zone such that when said third program means is selected said fan-box monitor means will not provide an output signal to said fan-powered mixing box assembly for increasing the heating supplied to said reference zone when the temperature trend in said reference zone indicates that the heat demands of said reference zone are being substantially satisfied.

10. In the system as defined in claim 1 wherein said controller means includes a zone thermostat, said means for determining the condition of air in each said zone including a first sensor for determining the temperature of the air in its respective said zone, said first sensor providing electrical signals to said thermostat indicative of the temperature of the air in respective said zone.

11. In the system as defined in claim 10 wherein said zone thermostat includes means for establishing the desired temperature in respective said zone.

12. In the system as defined in claim 11 wherein said programmable fan-box monitor means determines the demand for heating and cooling from all said zone thermostats, determines the number of zones having demand for heating or cooling, compares such number with a preselected number defining the system demand number, and if the number of zones demanding heating or cooling equals or exceeds said system demand number, said fan-box monitor means selects the desired heating or cooling mode respectively of said fan-powered mixing box assembly and provides output signals to all said zone thermostats for operating respective said zone damper means, said fan-box monitor means operates said fan-powered mixing box assembly in the selected mode until all said zone thermostats demanding the selected mode have been substantially satisfied.

13. In the system as defined in claim 12 wherein said fan-box monitor means includes a second sensor for determining the air pressure in said main duct.

14. In the system as defined in claim 13 wherein said fan-box monitor means includes first program means such that said fan-box monitor means operates said master damper to maintain duct air pressure within predetermined setpoints as established by said fan-box monitor means.

15. In the system as defined in claim 12 wherein said fan-box monitor means has a selectable first program means such that when said first program means is selected said fan-powered mixing box assembly is operated in a ventilation mode when the demand for heating and cooling from all zones is less than said system demand number.

16. In the system as defined in claim 15 wherein said fan-box monitor means includes a second sensor for determining the temperature of air in said main duct supplying air to respective said zone ducts said fan-box monitor means further including a second program means such that when said fan-powered mixing box assembly is operated in the ventilation mode, said fan-box monitor means will operate said master damper and said fan motor to maintain main duct temperature within predetermined setpoints as established by said fan-box monitor means.

17. In the system as defined in claim 15 wherein said fan-box monitor means has a second program means for monitoring the temperature trend in said reference zone when said fan-powered mixing box is being operated in the heating zone, said fan-box monitor means selectively controlling said heating element in response to said temperature trend.

18. In the system as defined in claim 12 wherein said fan-box monitor means compares the number of zones having a demand for heating and cooling and if the number of zones having a demand for heating is equal to the number of zones demanding cooling and the numbers equal or exceed the system demand number, said fan-box monitor means selects the zone with the greatest demand as a reference zone and operates said fan-powered mixing box assembly in the mode coincident to that demanded by said reference zone until said reference zone is substantially satisfied.

19. In the system as defined in claim 18 wherein said fan-box monitor means periodically determines the demand from each zone and, if the demand in another said zone, having a demand coincident with the mode in which said fan-powered mixing box is operating is greater than said reference zone, said other zone is selected as a new reference zone and said fan-powered mixing box assembly is operated until demand in said new reference zone is substantially satisfied.

20. In the system as defined in claim 19 wherein said fan-box monitor means receives data from said reference zone when said fan-powered mixing box assembly is operated in the heating mode, said fan-box monitor means provides an output signal to said fan-powered mixing box assembly for energizing said heating element in accordance with the demand of said reference zone.

21. In the system as defined in claim 20 wherein said fan-box monitor means includes a first program means such that when the number of zones demanding heat exceeds a predetermined number defining the heating demand qualifier number, said fan includes a multi-speed motor, said fan-box monitor means provides an output signal to said fan-powered mixing box assembly for increasing the speed of said fan motor.

22. In the system as defined in claim 13 wherein said fan-box monitor means includes a selectable first program means such that when said first program means is selected and the heating mode has been selected by said fan-box monitor means, said fan motor is energized and said at least one heating element is not energized unless the heating demand exceeds a predetermined level established by said fan-box monitor means.

23. In the system as defined in claim 22 wherein said fan includes a multi-speed motor, said fan-box monitor means operating said fan motor in accordance with the programming of said fan-box monitor means.

24. In the system as defined in claim 23 wherein said fan-box monitor means includes a second program such that if said motor of said fan has been energized in low speed, said fan-box monitor means will compare the number of zones demanding heat with a predetermined number defining the heating demand qualifier number established by said fan-box monitor means and if said number of zones equals or exceeds the heating demand qualifier number said motor will be operated in high speed.

25. In the system as defined in claim 24 wherein said fan-box monitor includes a second sensor for determining the air pressure in said main duct, said fan-box monitor means further including third program means such that when said fan-box monitor means is operating said motor in high speed, said motor will remain operating in high speed until the number of zones demanding heat is less than the heating demand qualifier number and the air pressure in said main duct is greater than a maximum predetermined setpoint as established by said fan-box monitor means, 26. A method of controlling the operation of a plurality of zone duct damper means located in respective zone ducts and a fan-powered mixing box assembly controlled by a controller means that supplies conditioned air into a main duct having a master damper means in the main duct which communicates with zone ducts associated with respective zones each having a zone damper means and a means of determining the desired zone setpoint and the zone temperature comprising the steps of:
  A. determining the demand for heating or cooling from all the zones;
  B. determining the number of the zones having a demand for heating and cooling;
  C. selecting a mode from the heating, cooling, and ventilating modes based upon mode demand;
  D. operating the appropriate zone damper means to closed position if the means controlling the appropriate dampers have no demand or demand a mode different than the mode selected in step C, and positioning open the other zone dampers;
  E. actuating the fan-powered mixing box assembly in the selected mode and operating the master damper until all zones demanding the selected mode have been satisfied;
  F. deactivating the fan-powered mixing box assembly; and
  G. repeating steps A-F for the other mode when demand for the other mode has been selected in accord with steps A-C.

27. The method of claim 26 wherein step B includes the steps of:
  H. selectively preselecting the number of the zones having demand for heating and cooling that is necessary to select a mode from the heating and cooling modes;
  I. comparing the numbers obtained in steps B and H and selecting either the heating mode or cooling mode when the number of the zones having a demand for either heating or cooling respectively is equal or greater than the number selected in step H.

28. The method of claim 26 wherein step D includes the step of:
  H. actuating some of the zone dampers to a partially open position depending upon the amount of demand by their respective thermostats and modulating such dampers between open and closed until the demand is satisfied.

29. The method of claim 26 further comprising the step of:
  H. comparing the number of demands after steps A-B and if the demand for heating and cooling are equal, the zone with the greatest demand is chosen as the reference zone and the fan-powered mixing box assembly is activated in step E in the mode coincident with the demand of the zone with the greatest demand.

30. The method of claim 29 further comprising the step of:
  I. either increasing or decreasing the heating output of the fan-powered mixing box assembly by the fan-box monitor in accordance with the demand of the reference zone.

31. The method of claim 29 further comprising the steps of:
  I. determining the temperature in the heating compartment of the fan-powered mixing box assembly; and
  J. deactivating the heating output of the fan-powered mixing box assembly by the controller if the heating compartment temperature exceeds predetermined setpoints established by the controller.

32. The method of claim 29 further comprising the steps of:
  I. determining the number of zones demanding heating; and
  J. increasing the speed of the fan in the fan-powered mixing box assembly when the number of zones demanding heating exceeds a predetermined number as established by the controller.

33. The method of claim 29 further comprising the step of:
  I. activating the fan-powered mixing box assembly by the fan-box monitor in the ventilation mode when the number of zones demanding heating and cooling is less than a predetermined number as established by the fan-box monitor.

34. The method of claim 29 further comprising the steps of:
  I. determining the outside air temperature outside the zones; and J. deactivating the fan-powered mixing box assembly by the fan-box monitor when the outside air temperature is greater than a predetermined value as established by said fan-box monitor.

35. The method of claim 29 further comprising the steps of:
I. determining the air pressure in the main duct; and
J. operating the master damper means by the fan-box monitor to maintain air pressure within setpoints as established by the fan-box monitor.

36. A method of monitoring and controlling the condition of air within each of a plurality of zones being supplied with conditioned air through zone dampers and zone ducts from a fan-powered mixing box assembly via a main duct communicating with the zone ducts and a master damper means in the main duct, a programmable fan-box monitor controls the master damper means and the fan-powered mixing box assembly, and programmable zone thermostats in respective zones control respective zone dampers comprising the steps of:
A. programming the setpoints of the zone thermostats during a plurality of distinct time periods;
B. activating the mixing box assembly by the fan-box monitor in the selected mode until all the zone thermostats demanding the selected mode have been satisfied;
C. positioning the zone duct damper means open if the zone thermostats are demanding the selected mode and closed for the other zone damper means; and
D. deactivating the mixing box assembly by the fan-box monitor.

37. The method of claim 36 further comprising the steps of:
E. determining the real time;
F. monitoring the demand for heating and cooling from all zone thermostats by the programmable fan-box monitor which selects either of the heating and cooling mode of the mixing box assembly during a distinct time period.

38. The method of claim 37 further comprising the step of:
G. selecting the mode of operation of the mixing box assembly in step F in accordance with the programming of the fan-box monitor such that when an equal number of zones demand heating and demand cooling during a distinct time period and the number of such zones is greater than a preselected number programmed in the fan-box monitor the zone with the greatest demand is chosen as the reference zone and the mixing box assembly is operated in a mode coincident with the mode demanded by the zone with the greatest demand.

39. The method of claim 38 further comprising the step of:
H. increasing or decreasing the heating output of the mixing box assembly by the fan-box monitor in accordance with the demand of said reference zone.

40. The method of claim 38 further comprising the steps of:
H. determining the temperature in the heating compartment of the mixing box assembly; and
I. deactivating the heating output of the mixing box assembly by the fan-box monitor if the heating compartment temperature exceeds predetermined setpoints established by the fan-box monitor.

41. The method of claim 38 further comprising the steps of:
H. determining the number of zones demanding heating; and
I. increasing the speed of the fan in the fan-powered mixing box assembly when the number of zones demanding heating exceeds a predetermined number as established by said fan-box monitor.

42. The method of claim 38 further comprising the step of:
H. activating the mixing box assembly by the fan-box monitor in the ventilation mode when the number of zones demanding heating and cooling is less than a predetermined number as established by said fan-box monitor.

43. The method of claim 38 further comprising the steps of:
H. determining the outside air temperature outside the zones; and
I. deactivating the mixing box assembly by the fan-box monitor when the outside air temperature is greater than a predetermined value as established by said fan-box monitor.

44. The method of claim 38 further comprising the steps of:
H. determining the air pressure in the main duct; and
I. operating the master damper means by the fan-box monitor to maintain air pressure within setpoints as established by said fan-box monitor.

45. A method of controlling the operation of a plurality of zone duct damper means located in respective zone ducts and a fan-powered mixing box assembly controlled by a means supplying conditioned air into a main duct having air flow control means in the main duct which communicates with zone ducts associated with respective zones comprising the steps of:
A. determining the demand for heating or cooling in all zones and whether the fan-powered mixing box has selected either the heating or cooling mode;
B. controlling the fan-powered mixing box in the mode selected;
C. operating zone duct dampers to close all not desiring conditioned air from the fan-powered mixing box in the mode selected and to open all desiring conditioned air in the mode selected; and
D. operating the air flow control means and the fan-powered mixing box to control air supplied to the zones until all zones demanding the selected mode have been substantially satisfied.

46. The method of claim 45 further comprising the steps of:
E. determining the zone which has the greatest demand after step A; and
F. operating the air flow control means and the fan-powered mixing box to control air supplied to the zones until the reference zone has been substantially satisfied.

47. The method of claim 46 further comprising the steps of:
G. measuring the temperature trend in the reference zone when the fan-powered mixing box is in the heating mode; and
H. operating the fan-powered mixing box to supply heating to the reference zone in response to the temperature trend.

* * * * *